(12) United States Patent
Bello

(10) Patent No.: US 9,610,900 B1
(45) Date of Patent: Apr. 4, 2017

(54) APPARATUS FOR LEVELLY SUPPORTING OBJECTS OVER AN INCLINED SURFACE

(71) Applicant: Jennifer Bello, Belle Mead, NJ (US)

(72) Inventor: Jennifer Bello, Belle Mead, NJ (US)

( * ) Notice: Subject to any disclaimer, the term of this patent is extended or adjusted under 35 U.S.C. 154(b) by 0 days.

(21) Appl. No.: 15/151,086

(22) Filed: May 10, 2016

(51) Int. Cl.

| | | |
|---|---|---|
| *A45D 19/04* | (2006.01) |
| *A47J 47/16* | (2006.01) |
| *F16M 11/00* | (2006.01) |
| *B60R 7/04* | (2006.01) |
| *A47G 23/02* | (2006.01) |
| *B60N 3/10* | (2006.01) |
| *B60N 3/00* | (2006.01) |
| *A47K 1/08* | (2006.01) |
| *A47B 97/04* | (2006.01) |
| *A47G 1/24* | (2006.01) |
| *A47B 65/00* | (2006.01) |
| *A47G 29/00* | (2006.01) |
| *B65D 1/34* | (2006.01) |
| *B65D 6/04* | (2006.01) |
| *A47B 41/04* | (2006.01) |

(Continued)

(52) U.S. Cl.
CPC .......... *B60R 7/043* (2013.01); *A47G 23/0208* (2013.01); *B60N 3/002* (2013.01); *B60N 3/102* (2013.01); *A45F 2200/0583* (2013.01); *A47B 23/043* (2013.01); *A47B 23/044* (2013.01); *A47B 31/06* (2013.01); *A47B 2200/0019* (2013.01); *A47F 5/112* (2013.01); *B60N 3/004* (2013.01); *B60N 3/005* (2013.01); *B60N 3/007* (2013.01); *B60N 3/103* (2013.01); *B60N 3/105* (2013.01); *B65D 1/34* (2013.01); *B65D 1/36* (2013.01); *B65D 5/5206* (2013.01); *B65D 5/5273* (2013.01)

(58) Field of Classification Search
CPC ....... A47B 31/06; A47B 31/04; A47B 23/043; A47B 2220/0019; B60N 3/004; B60N 3/002; B60N 3/005; B60N 3/007; B60N 3/102; B60N 3/103; B60N 3/105; A47F 5/112; A47F 5/11; B65D 2581/356; B65D 5/5206; B65D 5/5273; B65D 1/36; B65D 1/34
USPC .... 248/174, 311.2, 448, 454, 456, 457, 459; 108/32, 43, 44; 224/275, 320, 557, 563; 206/563, 564; 211/43, 73; 229/104; 40/120
See application file for complete search history.

(56) References Cited

U.S. PATENT DOCUMENTS 2,416,754 A * 3/1947 Horr ................ A47F 5/112
434/217
2,726,835 A * 12/1955 Hummel ............... A47F 5/112
211/73

(Continued)

Primary Examiner — Brian Mattei
Assistant Examiner — Taylor Morris
(74) Attorney, Agent, or Firm — Thomas J. Germinario

(57) ABSTRACT

An apparatus supports objects on a level support plane above an underlying inclined surface, such as a vehicle seat. It comprises three or more substantially rectangular panels that are rotatably interconnected so as to form an isosceles triangular profile, in which the equal sides serve as support panels, and the shortest side is an elevation panel. Each support panel can incorporate one or more container retention structures on both its obverse and reverse surface. The apparatus is configurable, through the rotation of its panels, so that either surface of each support panel can provide the level support plane that supports objects.

6 Claims, 11 Drawing Sheets

(51) Int. Cl.
*A47B 23/00* (2006.01)
*A47B 37/00* (2006.01)
*B65D 5/52* (2006.01)
*A47F 5/11* (2006.01)
*A47B 23/04* (2006.01)
*B65D 1/36* (2006.01)
*A47B 31/06* (2006.01)

(56) References Cited

U.S. PATENT DOCUMENTS

| | | | | |
|---|---|---|---|---|
| 3,318,456 A | * | 5/1967 | Lipe | B60N 3/002 108/44 |
| 3,326,446 A | | 6/1967 | Goings | |
| 3,379,316 A | * | 4/1968 | Harrell | B60N 3/002 211/132.1 |
| 3,434,650 A | * | 3/1969 | Goings | B65D 71/72 206/563 |
| 4,105,182 A | * | 8/1978 | Jacobson | B42F 13/402 211/42 |
| 4,880,327 A | * | 11/1989 | Sanabria | A47B 23/043 281/33 |
| 5,102,080 A | * | 4/1992 | Altieri, Jr. | B60N 3/103 224/275 |
| 5,722,628 A | * | 3/1998 | Menaged | A47B 23/043 211/50 |
| 6,038,983 A | * | 3/2000 | Lendl | B60N 3/005 108/44 |
| 6,543,949 B1 | * | 4/2003 | Ritchey | A47B 21/0371 400/691 |
| 7,415,932 B1 | * | 8/2008 | Ngo | A47B 23/001 108/115 |
| 7,481,169 B2 | | 1/2009 | Larson | |
| 2002/0162935 A1 | * | 11/2002 | Hardy | A47B 23/044 248/460 |
| 2005/0205571 A1 | | 9/2005 | Carpenter | |
| 2008/0067205 A1 | | 3/2008 | Semendoff | |
| 2008/0223913 A1 | | 9/2008 | Nadeau | |
| 2012/0235008 A1 | * | 9/2012 | Schwartz | A47B 23/04 248/454 |

* cited by examiner

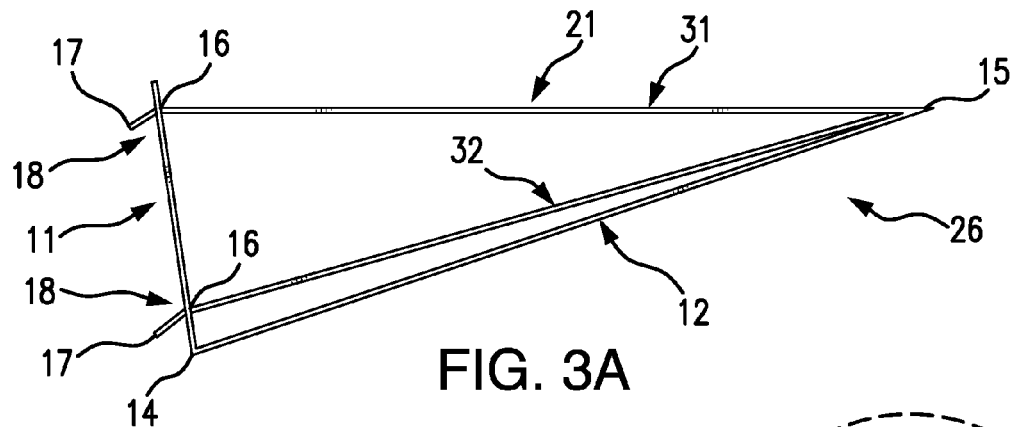
FIG. 3A
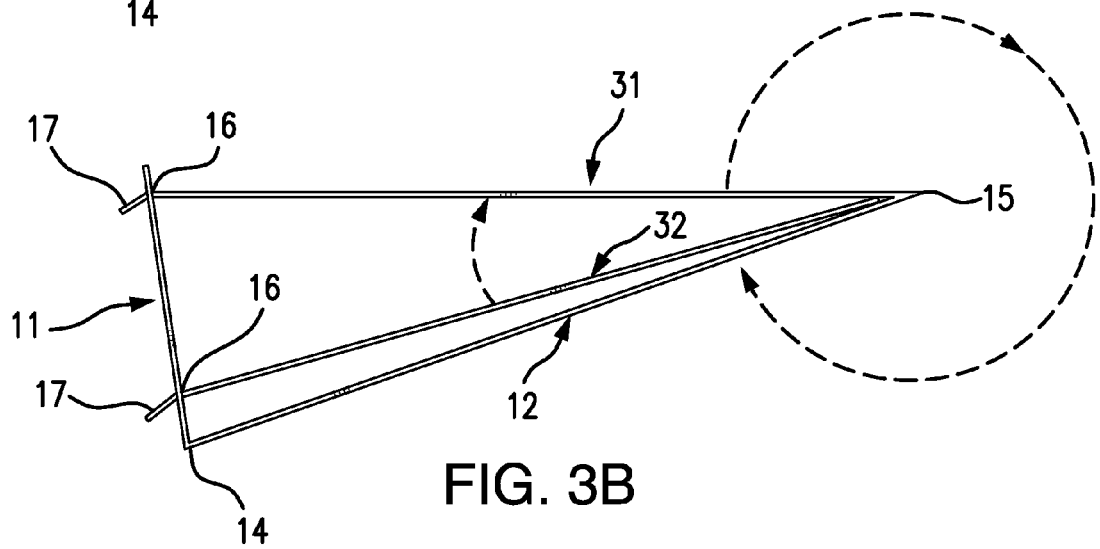
FIG. 3B
FIG. 3C

APPARATUS FOR LEVELLY SUPPORTING OBJECTS OVER AN INCLINED SURFACE

FIELD OF INVENTION

The present invention relates to field of apparatus and devices for securely supporting objects on a level support plane above an underlying inclined surface. More particularly, the invention relates to such apparatus and devices which incorporate structures for securing and retaining objects on the level support plane.

BACKGROUND OF THE INVENTION

The practical problems associated with placing objects on an inclined surface so that they don't slide down arise in many situations. The most common situations involve the inclined surfaces of vehicle seats, where purchased items are often placed while being transported home from a store. When the transported items are food and/or drink, the tendency to shift and slide back on the vehicle seat during transport frequently causes the items to be damaged and/or spilled. The classic example of this is the shifting pizza box, in which the pizza topping becomes badly smeared during transport.

As the pace of modern life accelerates, leaving less and less time for home food preparation, vehicle transport of "take-out" food items becomes an almost daily task. As the food items to be transported have become more diverse, so have their containers. While several "car seat levelers" have appeared in the patent literature, these devices can only incorporate one or two container retention structures, because they only provide a single level surface to accommodate such structures.

The present invention, on the other hand, is able to accommodate several different container retention structures by providing multiple mutually rotatable support panels, with each support panel incorporating container retention structures on both its surfaces. Through rotation of the panels, any one of the support panel surfaces can be positioned in a level orientation, so that its particular container retention structures can be used. Therefore, the present invention provides a versatility not found in seat levelers having only one available level support surface.

SUMMARY OF THE INVENTION

As used herein, the term "panel" means a rigid, thin, flat structural member, such as the panels comprising a cardboard box.

The present invention is an apparatus which supports at least one item on a level plane over an underlying inclined surface, such as a vehicle seat. It comprises three or more substantially rectangular panels that are rotatably interconnected so as to form an isosceles triangular profile, in which the equal sides correspond to support panels, and the shortest side corresponds to an elevation panel. As shown in FIG. 1, one of the support panels is a primary support panel 12, a first side of which is rotatably attached, along a primary connecting edge 14, to one of the longer sides of the elevation panel 11. A second opposite side of the primary support panel 12 is rotatably attached, along an adjunct connecting edge 15, to the adjunct support panel(s) 13.

Opposite the adjunct connecting edge 15, the adjunct support panel(s) 13 have an adjunct free edge 16, from which extend at least one releasable adjunct attachment means 17. In FIG. 1, the exemplary adjunct attachment means 17 is a flexible tab, but it can alternately be a releasable adhesive, such as hook-and-loop, or a releasable mechanical clip or clasp. The adjunct attachment means 17 cooperate(s) conjugately with multiple elevation attachment means 18 distributed across the width of the elevation panel 11. In the illustrative example of FIG. 1, the elevation attachment means 18 consists of multiple slots, which is configured to receive the flexible tab 17, but they can alternately be conjugate releasable adhesive members, such as hook-and-loop, or conjugate receptors of a mechanical clip or clasp. The conjugate connection of the adjunct attachment means 17 with the elevation attachment means 18 is configured to releasably secure one of the adjunct support panels 13 at a panel angle 19 with respect to the primary support panel 12. The panel angle 19 is adjustable, by relocating the adjunct attachment means 17 to vertically connect to different elevation attachment means 18, so as to be equal to the inclination angle 20 of the inclined surface.

The primary connecting edge 14 and the adjunct connecting edge 15 are configured so that each of the interconnected panels are free to rotate around the connecting edge 14 15 through an angle of at least 270°. This can be achieved by forming the edge connection with a flexible plastic strip or a plastic adhesive strip. If the panels are cardboard or plastic, for example, the adhesive strip can be a flexible plastic tape or duct tape. The edge connection can also be strip of flexible plastic that acts as a hinge.

Free rotation of the panels relative to one another enables alternate configurations, in which either of the surfaces of any one of the support panels can provide the level support plane to support the items/objects. These alternate level plane configurations are illustrated in FIGS. 2A-2C. FIG. 2A shows a first configuration, in which the level support plane 21 is the adjunct support panel's obverse side 24. As depicted in FIG. 2B, the adjunct support panel 13 can be released from the elevation panel 11 and rotated about the adjunct connecting edge 15, while the elevation panel 11 is rotated in the opposite direction about the primary connecting edge 14 to rejoin and reconnect with the adjunct support panel 13 to form a second configuration, depicted in FIG. 2C. In the second configuration, the level support plane 21 is the primary support panel's reverse side 23.

As depicted in FIG. 2D, the first configuration (FIG. 2A) can be inverted to provide a third configuration, in which the level support plane 21 is the primary support panel's obverse side 22. Similarly, as shown in FIG. 2E, the second configuration (FIG. 2C) can be inverted to provide a fourth configuration, in which the level support plane 21 is the adjunct support panel's reverse side 25. Therefore, the freely rotatable panels enable two different level plane configurations 26 for each support panel.

Generalizing from this example, the apparatus can alternately be adjusted in any one of $2n$ level plane configurations 26, where n is the number of support panels. For each level plane configuration 26, a separate and potentially different set of structures for securing and retaining items and/or objects can be incorporated in the corresponding level support plane 21, thereby endowing this apparatus with much greater versatility than other types of car seat levelers.

While the foregoing examples involve only two support panels. FIGS. 3A-3C illustrate an apparatus comprising three support panels, consisting of the primary support panel 12, a first adjunct support panel 31 and a second adjunct support panel 32. In the initial configuration of FIG. 3A, the level support plane 21 is the first adjunct support panel 31. In this configuration, the second adjunct support panel 32 remains attached to the elevation panel 11 at a lower level, where it's not yet exposed. FIG. 3B shows the first adjunct support panel 31 being detached from the elevation panel 11 and rotated around the adjunct connecting edge 15 to a position flush with the primary support panel 12, where it's reattached to the elevation panel 11 at the lowest level. Next the second adjunct support panel 32 is detached from the lower level of the elevation panel 11, rotated upward, and then reattached at the level where the first adjunct support panel 31 was previously attached. The resulting configuration, in which the level support plane 21 is the second adjunct support panel 32, is depicted in FIG. 3C.

It should be understood that, through rotations of the panels corresponding to those depicted in FIGS. 2A-2E for two support panels, the apparatus comprising three support panels as shown in FIGS. 3A-3C can produce six distinct alternate level plane configurations 26, which can accommodate as many as six different object support structures.

The freely rotatable panels of this invention have the further advantage of enabling the entire apparatus to be collapsed into a substantially flattened, compact configuration for convenient storage when not in use. This is illustrated in FIGS. 4A-4B. FIG. 4A shows the initial configuration, identical to that of FIG. 3C. To collapse the device, the second adjunct support panel 32 is first detached from the elevation panel 11, which is then rotated downward so as to be flush with the primary support panel 12. Next, the second adjunct support panel 32 is rotated downward against the elevation panel 11. Finally, if there were any object support structures projecting upward from the second adjunct support panel 32, there would be folded flat against that panel to complete the collapse of the entire apparatus into a substantially flattened configuration.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

BRIEF DESCRIPTION OF THE DRAWINGS

FIG. 3A is a side profile view of an embodiment of the present invention having three support panels;

FIGS. 3B-3C depict the embodiment of FIG. 3A with the panels rotated into two different level plane configurations;

DETAILED DESCRIPTION OF THE PREFERRED EMBODIMENT

Figure 5:
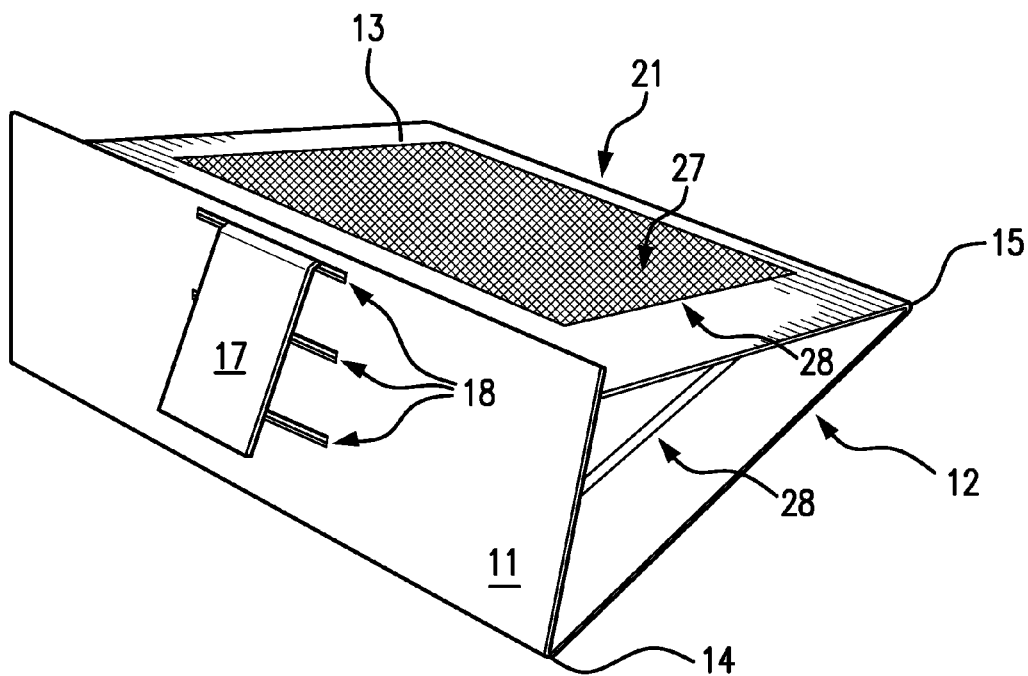
FIG. 5 is a perspective view of an embodiment of the present invention having two support panels and having two object support structures consisting of non-skid surfaces.
Figure 6:
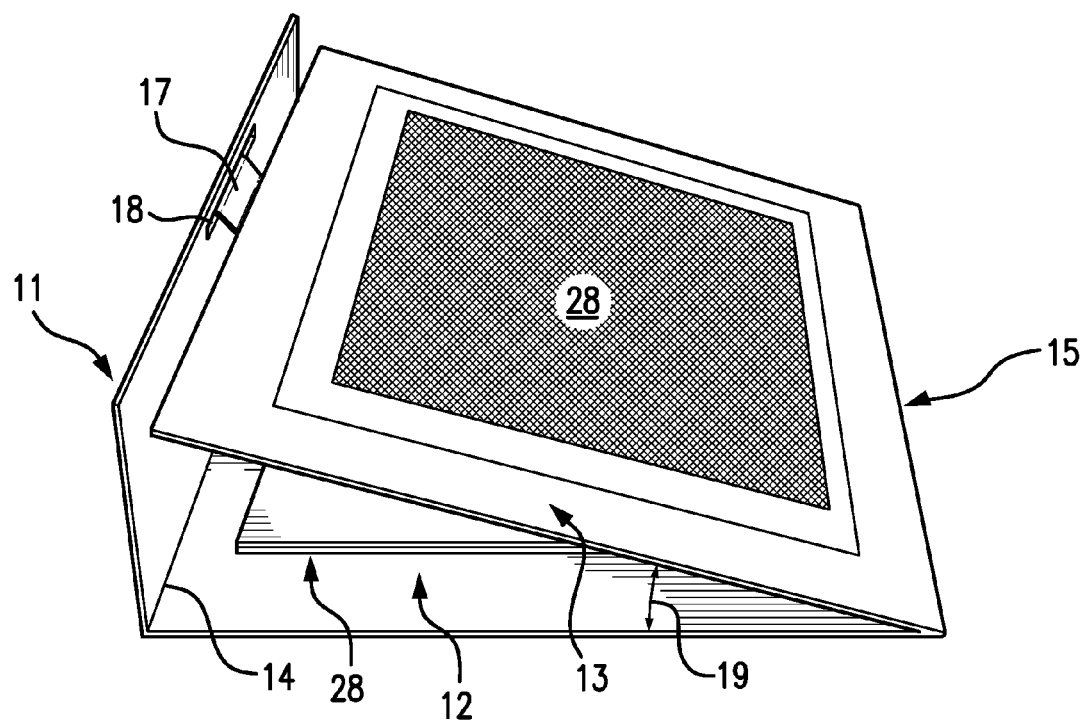
FIG. 6 is another perspective view of the embodiment shown in FIG. 5.

Referring to FIGS. 5 and 6, one embodiment of the present invention has two support panels, consisting of a primary support panel 12 and an adjunct support panel 13, which provides the level support plane 21. Strips of flexible plastic or plastic tape form the rotatable primary connecting edge 14 and the adjunct connecting edge 15. The primary support panel 12 and the adjunct support panel 13 both have object support structures 27 consisting of non-skid surfaces 28. The elevation panel 11 supports the adjunct support panel 13 at the selected panel angle 19 by the insertion of a flexible tab 17 into one of multiple slots 18.

Figure 7:
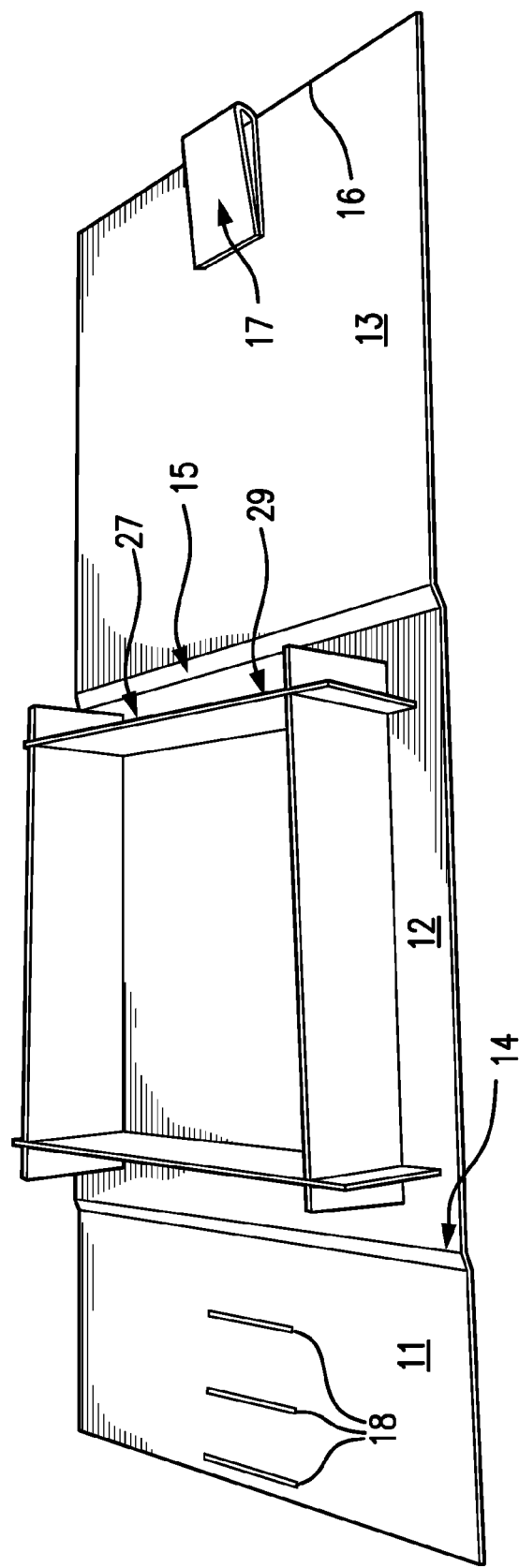
FIG. 7 is a perspective view of an embodiment having two support panels and having an object support structure comprising foldable retention walls.
Figure 8:
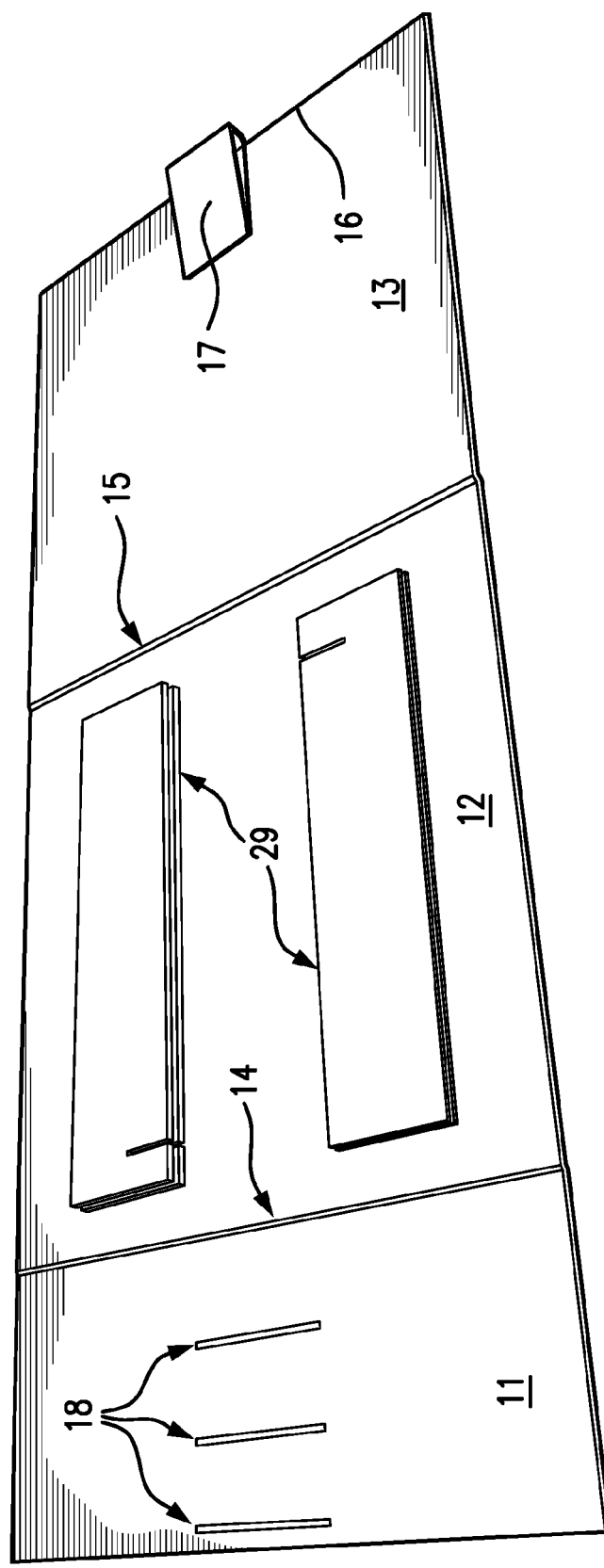
FIG. 8 is a perspective view of the embodiment shown in FIG. 7 with the retention walls folded down.

Referring to FIGS. 7 and 8, another embodiment of the present invention also has two support panels, with the primary support panel containing an object retention structure 27 consisting of foldable walls 29. The rotatable primary connecting edge 14 and adjunct connecting edge 15 are formed by strips of flexible plastic or plastic tape.

Figure 9:
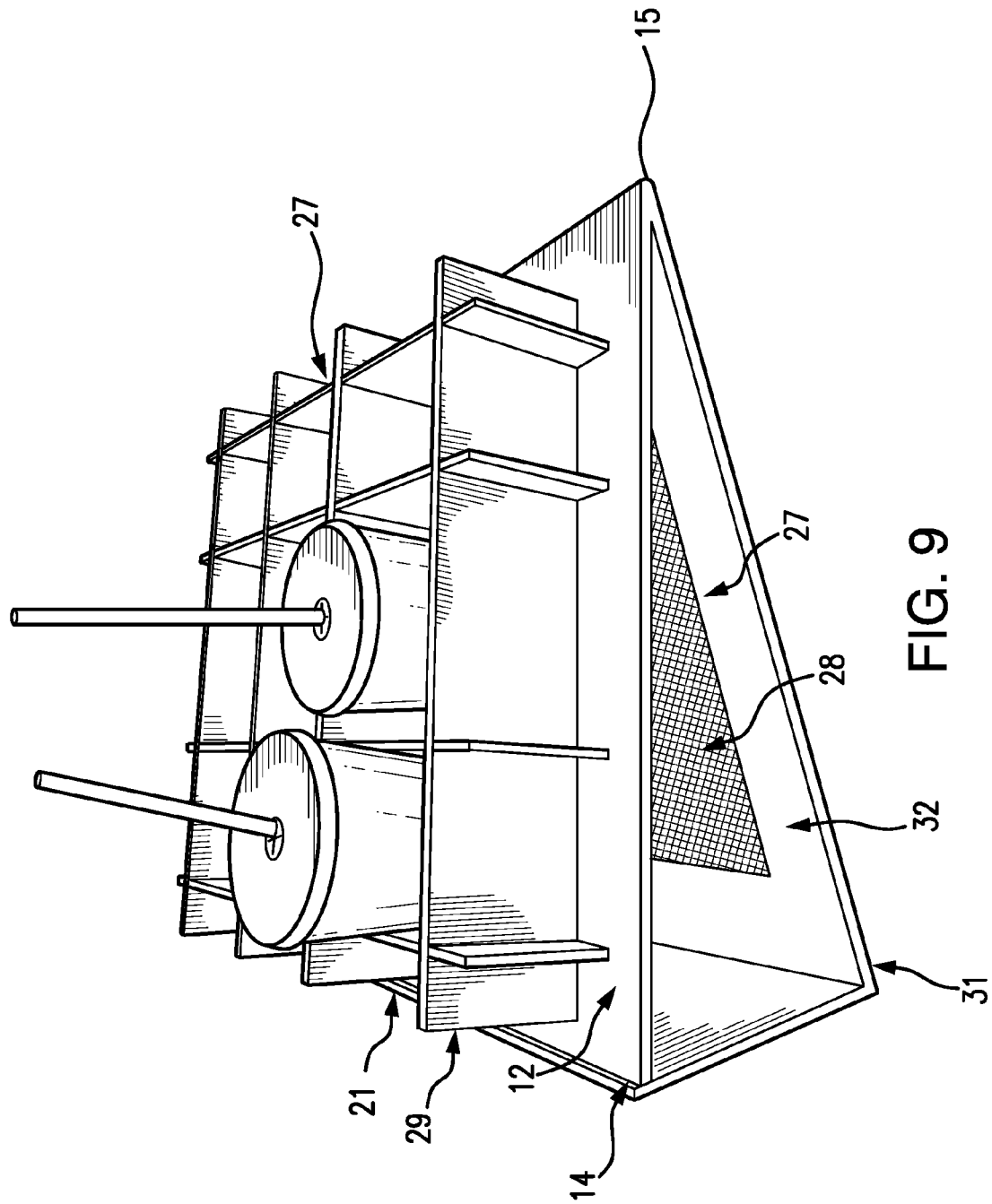
FIG. 9 is a perspective view of an embodiment having three support panels and having object support structures comprising foldable wall compartments and a non-skid surface.
Figure 10:
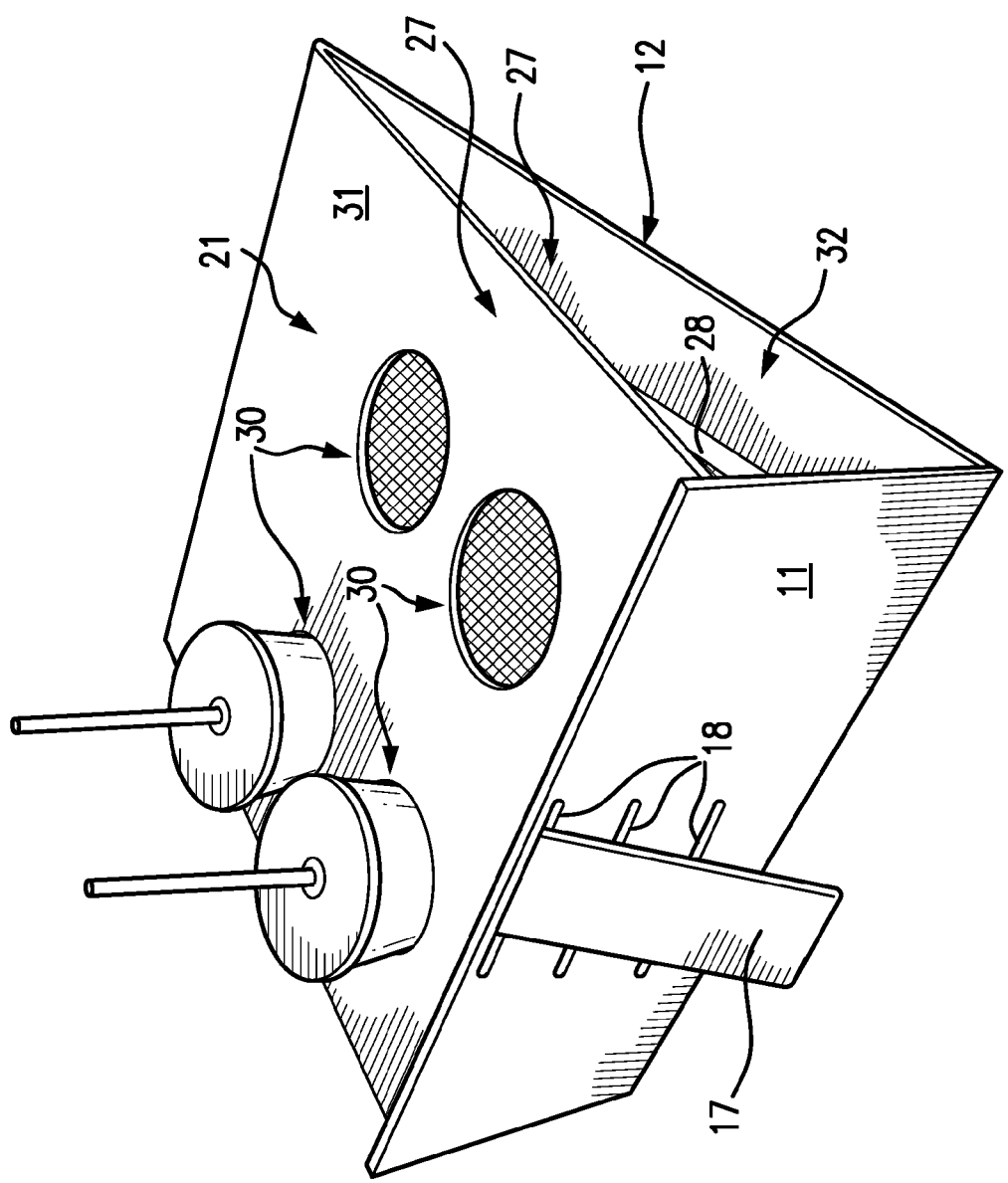
FIG. 10 is a perspective view of an embodiment having three support panels and having object support structures comprising circular apertures and a non-skid surface.

In FIGS. 9 and 10 are depicted embodiments having three support panels, consisting of the primary support panel 12, the first adjunct support panel 31, and the second adjunct support panel 32. In FIG. 9, the level support plane 21 is the primary support panel 12, which has an object retention structure 27 consisting of foldable partition walls 29, adapted for holding drink cups. The second adjunct support panel 32 contains, as an object support structure 27, a non-skid surface 28.

In FIG. 10, the level support plane 21 is provided by the first adjunct support panel 31, which has, as its object retention structures 27, four circular apertures 30 adapted for holding drink cups.

Figure 1:
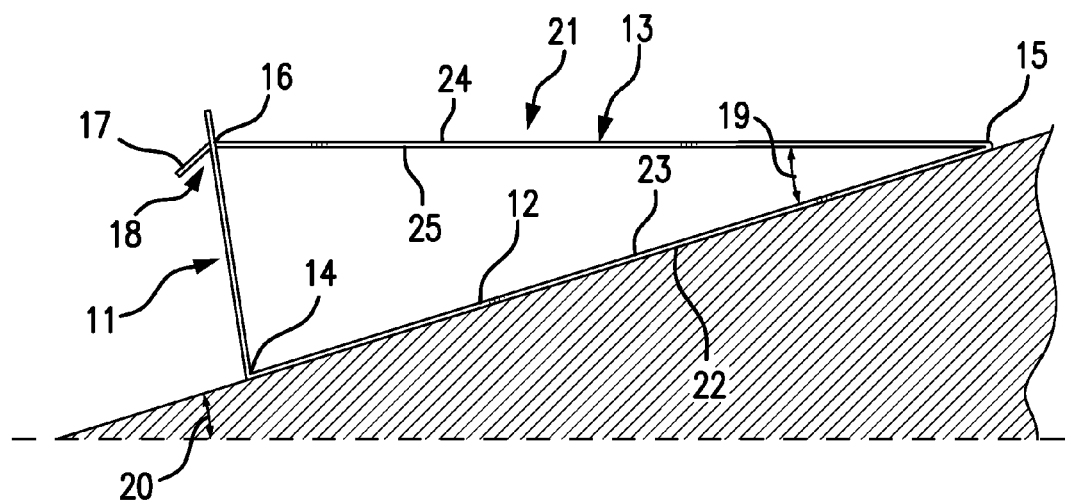
FIG. 1 is a side profile view of an embodiment of the present invention having two support panels.
Figure 2A:
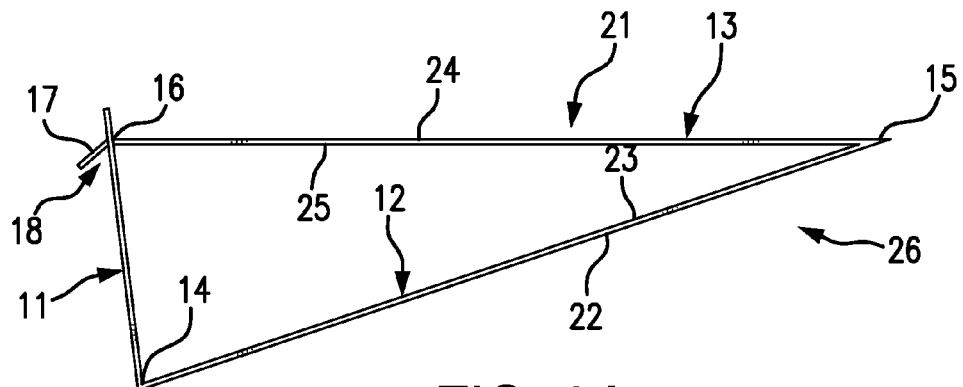
FIGS. 2A-2E depict the embodiment of FIG. 1 with the panels rotated into four different level plane configurations.
Figure 2B:
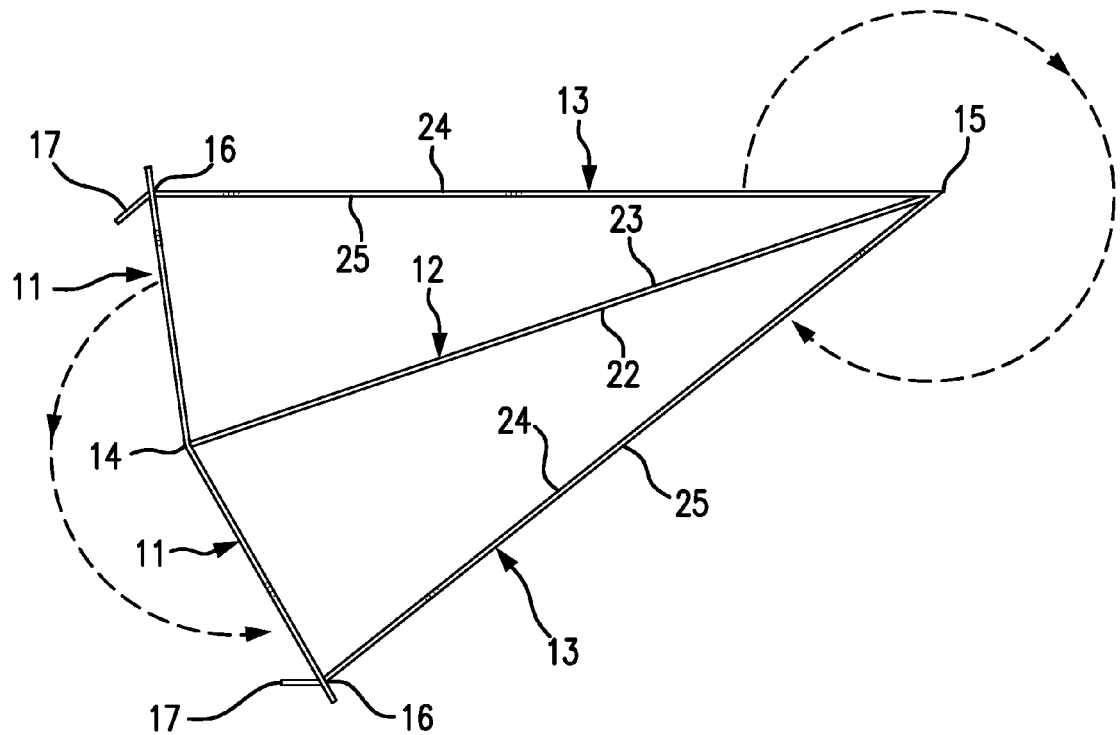
Figure 2C:
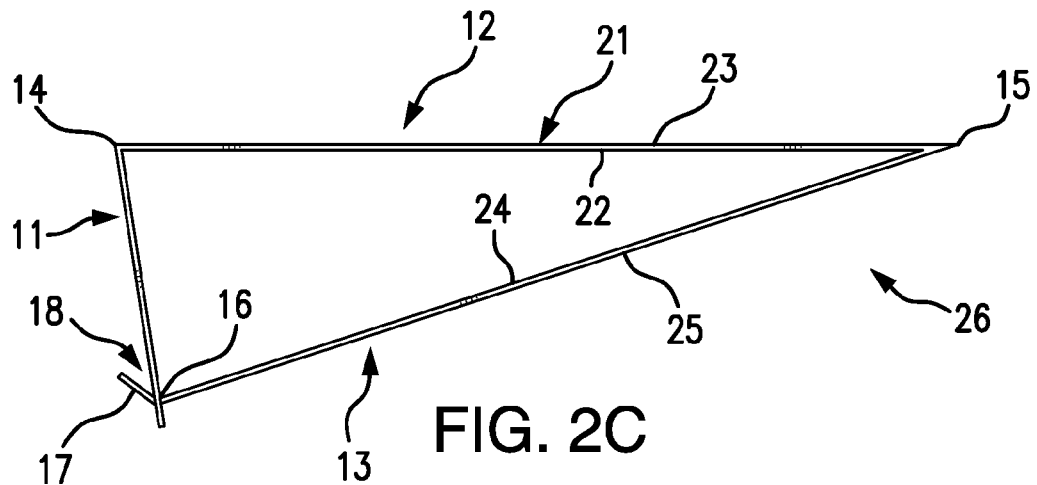
Figure 2D:
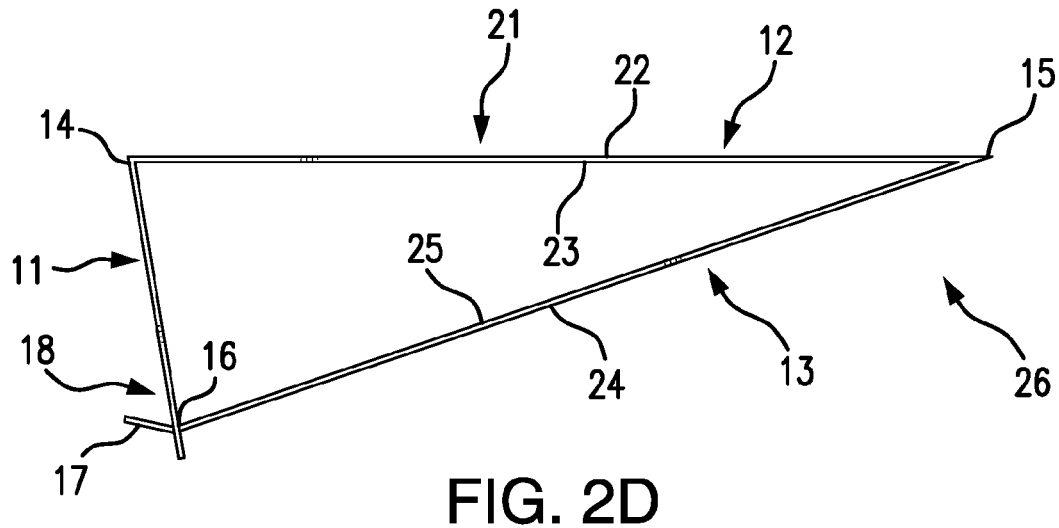
Figure 2E:
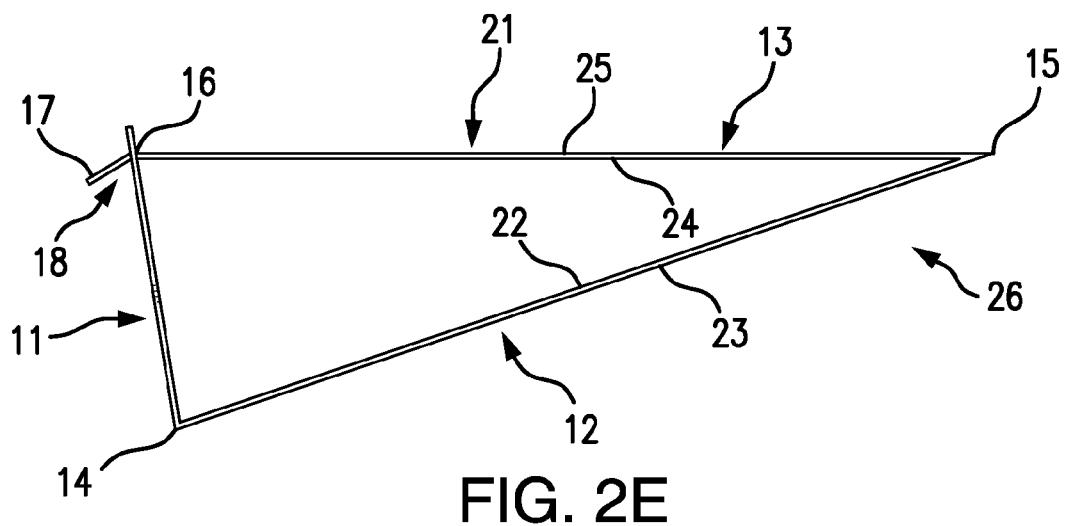
Figure 4A:
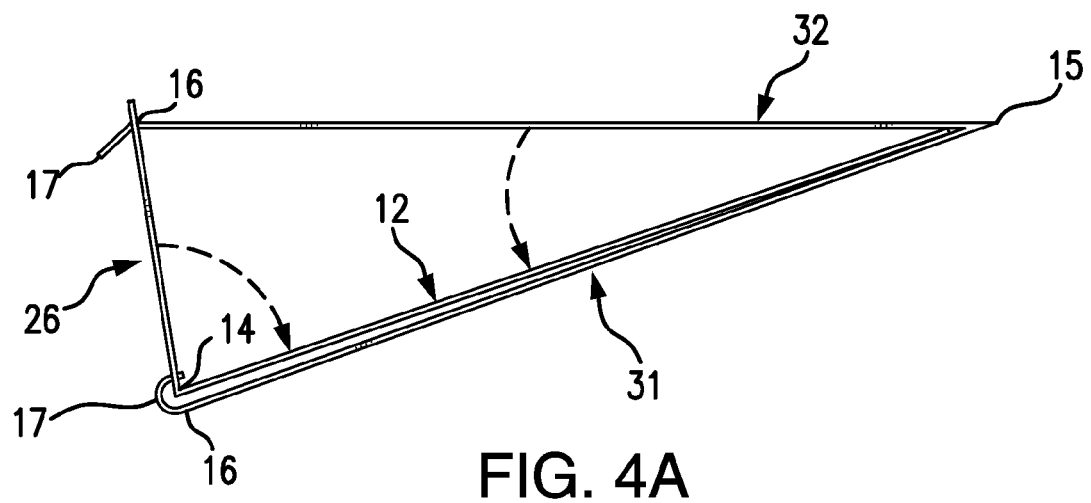
FIG. 4A depicts the configuration of FIG. 3C with the panels being rotated toward a flattened configuration.
Figure 4B:
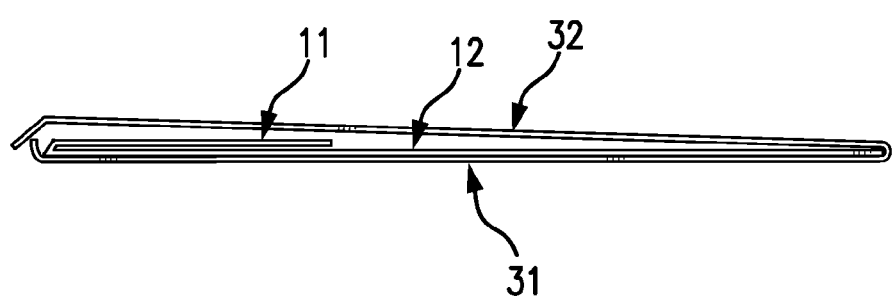
FIG. 4B depicts the embodiment of FIG. 3A with the panels rotated into a flattened configuration.
Figure 11:
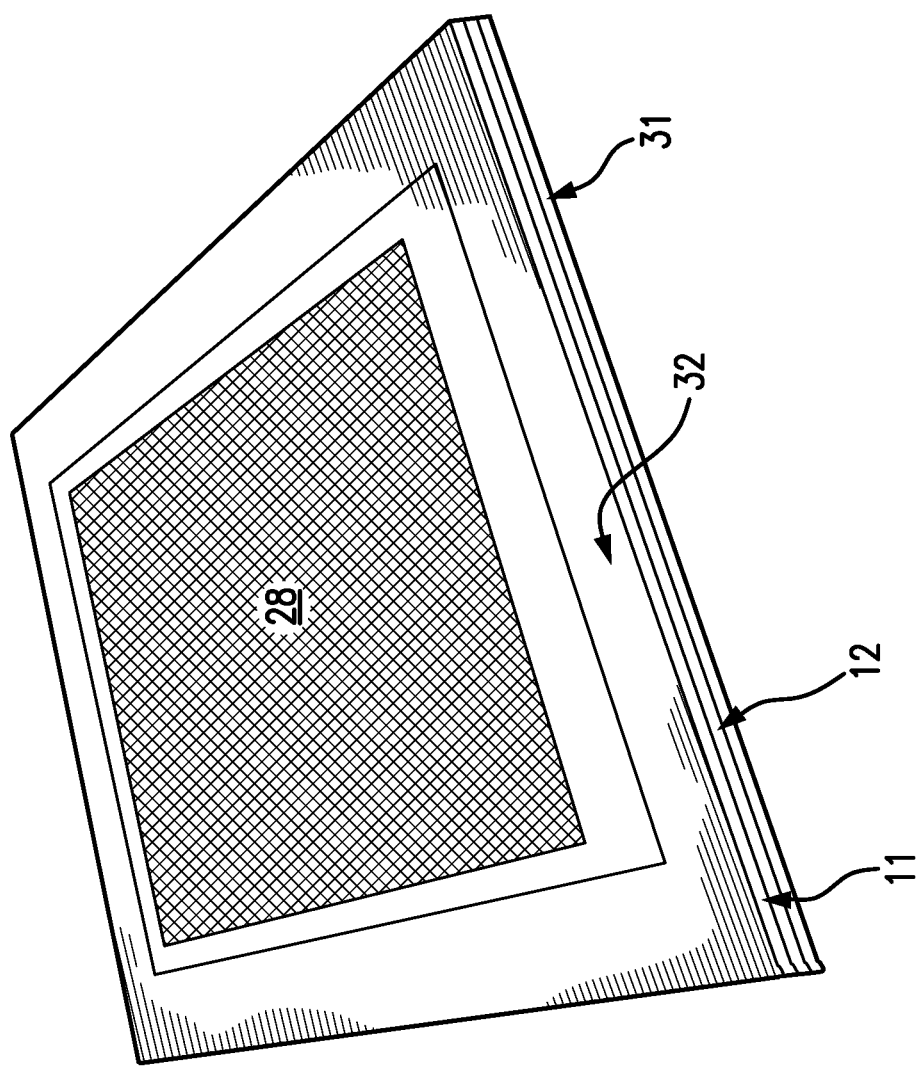
FIG. 11 is a perspective view of the embodiment shown in FIG. 9 folded into a flattened configuration.

FIG. 11 depicts the embodiment of FIG. 9 folded down into a substantially flattened configuration, in accordance with FIGS. 4A and 4B, for convenient storage.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. An apparatus for supporting on a level support plane one or more objects above an inclined surface, comprising:
   three or more panels consisting of an elevation panel and two or more support panels, which support panels consist of a primary support panel and one or more adjunct support panels;
   wherein the elevation panel is substantially rectangular and has an obverse side, a reverse side, an elevation panel length, and an elevation panel width;
   wherein the primary support panel is substantially rectangular or square and has an obverse side, a reverse side, a primary support panel length, which is equal to the elevation panel length, and a primary support panel width, which is greater than the elevation panel width;

wherein each of the adjunct support panels is substantially congruent with the primary support panel and has an obverse side, a reverse side, an adjunct support panel length, which is equal to the primary support panel length, and an adjunct support panel width, which is equal to the primary support panel width;

wherein the elevation panel is rotatably attached lengthwise along a primary connecting edge to a first side of the primary support panel, and the primary connecting edge is configured to allow the primary support panel to rotate around the primary connecting edge through an angle of at least 270°;

wherein each of the adjunct support panels is rotatably attached lengthwise along an adjunct connecting edge to a second side of the primary support panel, which second side is opposite the first side of the primary support panel, and the adjunct connecting edge is configured to allow each of the adjunct support panels to rotate around the adjunct connecting edge through an angle of at least 270°;

wherein each of the adjunct support panels has an adjunct free edge, which is opposite the adjunct connecting edge and from which extend one or more adjunct attachment means;

wherein the elevation panel has multiple elevation attachment means, distributed across the elevation panel width, which elevation attachment means cooperate conjugately with the adjunct attachment means, and which elevation attachment means are configured to releasably secure one of the adjunct support panels, with respect to the primary support panel, at a panel angle, which is adjustably equal to an inclination angle of the inclined surface;

wherein the panels are configurable, by rotation of one or more of the panels about the primary connecting edge and the adjunct connecting edge, to orient as the level support plane, alternatively, the obverse side or the reverse side of the primary support panel, or the obverse side or the reverse side of one of the adjunct support panels, so that the apparatus has 2n alternate level plane configurations, where n is the number of support panels; and wherein each level plane configuration has on the corresponding level support plane, one or more object support structures, which are adapted to secure one or more of the objects.

2. The apparatus according to claim 1, wherein one or more of the object support structures is foldable into a substantially flat profile.

3. The apparatus according to claim 2, wherein the panels can be rotated so as to lie substantially flat upon one another, thereby collapsing the apparatus into a substantially flattened, compact configuration for convenient storage when not in use.

4. The apparatus according to claim 1, wherein the apparatus comprises four or more panels consisting of an elevation panel and three or more support panels, which support panels consist of a primary support panel and two or more adjunct support panels.

5. The apparatus according to claim 4, wherein one or more of the object support structures is foldable into a substantially flat profile.

6. The apparatus according to claim 5, wherein the panels can be rotated so as to lie substantially flat upon one another, thereby collapsing the apparatus into a substantially flattened, compact configuration for convenient storage when not in use.

* * * * *